J. BJORNLIE.
BELT REEL AND GUIDE FOR THRESHING MACHINES.
APPLICATION FILED JAN. 5, 1909.
950,462.
Patented Feb. 22, 1910.
2 SHEETS—SHEET 1.
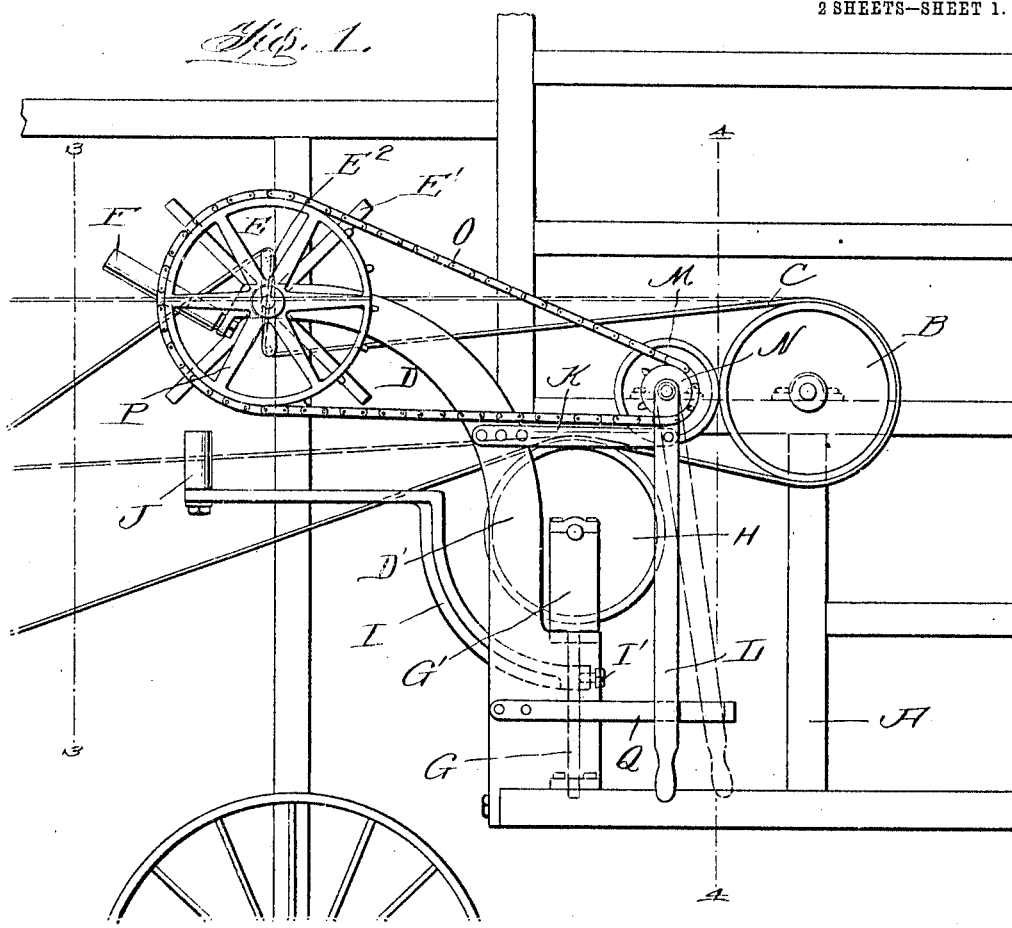

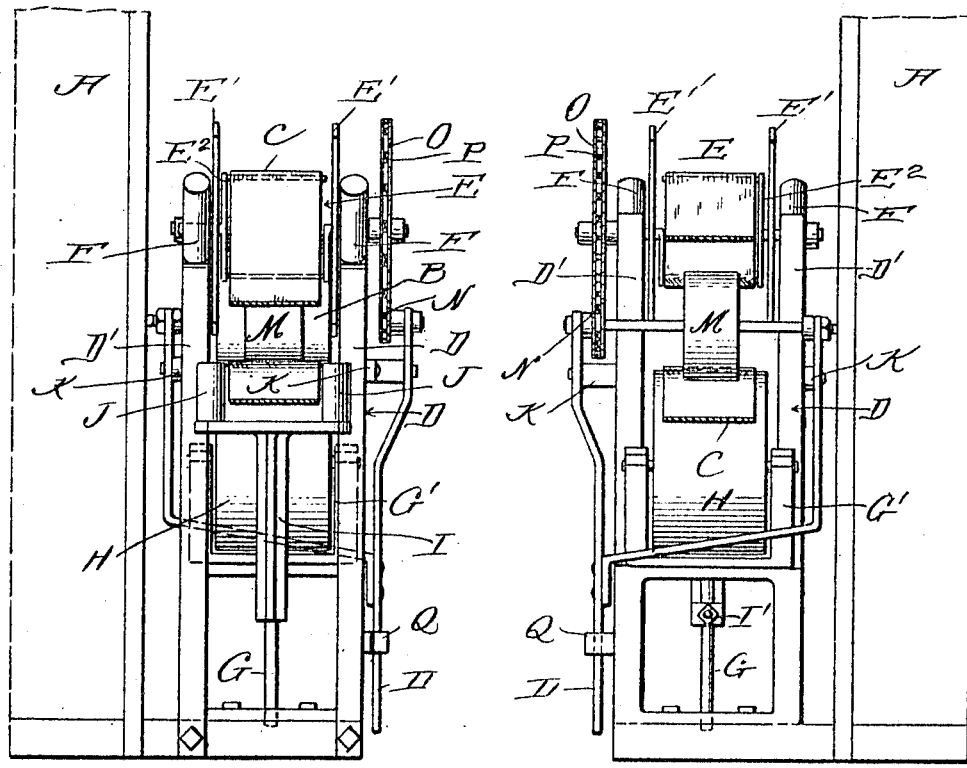

UNITED STATES PATENT OFFICE.

JULIUS BJORNLIE, OF ELKTON, SOUTH DAKOTA.

BELT REEL AND GUIDE FOR THRESHING-MACHINES.

950,462.  Specification of Letters Patent.  Patented Feb. 22, 1910.

Application filed January 5, 1909. Serial No. 470,822.

*To all whom it may concern:*

Be it known that I, JULIUS BJORNLIE, a citizen of the United States, residing at Elkton, in the county of Brookings and State of South Dakota, have invented a new and useful Improvement in Belt Reels and Guides for Threshing-Machines, of which the following is a specification.

This invention relates to certain new and useful improvements in belt reels and guides for threshing machines the object being to provide a device by means of which the drive belt connecting the threshing machine to the traction engine can be quickly wound upon the reel carried by the threshing machine after the threshing has been completed.

Another object of the invention is to provide a device with guide members so that the belt will be held in its proper position at all times during the operation.

A further object of my invention is to provide a device which is operated by the momentum of the drive pulley of the threshing machine, a frictional drive wheel being thrown into engagement with the drive pulley by a lever.

A still further object of the invention is to provide a device which is exceedingly simple and cheap in construction and one which is composed of a very few parts which are so mounted that the drive belt will have free motion when driving the threshing machine and one which the belt can be wound upon the reel by simply operating a lever.

With these various objects in view, my invention consists in the novel features of construction, combination and arrangement of parts hereinafter described, pointed out in the claims and shown in the accompanying drawings, in which:—

Figure 1 is a side elevation of my improved device showing it applied to a threshing machine. Fig. 2 is a detail top plan view of the same. Fig. 3 is a section taken on the line 3—3 of Fig. 1. Fig. 4 is a section taken on the line 4—4 of Fig. 1.

Referring to the drawing, A indicates a portion of a threshing machine, B a drive pulley and C a drive belt connecting the drive pulley of the threshing machine to the drive wheel of the traction engine, not shown, and in use this belt is generally about sixty or eighty feet long. Secured to the threshing machine is a frame D comprising spaced arms D' extending forwardly as clearly shown between which is pivotally mounted a reel E provided with hand spokes E' so that the wheel can be operated by hand when desired. The reel is provided with winding arms E² which are normally held in a horizontal position over which the drive belt C passes as clearly shown in dotted lines in Fig. 1. Secured to the forward end of the arms D' are guide rollers F which hold the belt C in position when in operation so as to prevent the belt from engaging the sides of the reel thereby allowing the belt to travel freely over the reel.

Mounted on the frame D is an upright G provided with a forked portion G' between which is mounted a guide roller H which is normally engaged by the belt C so as to hold it tightly on the drive pulley B when in operation so that all danger of the belt slipping is prevented. Pivotally mounted on the upright G is an arm I which is locked in its adjusted position by a set screw I' and is provided with guide rollers J at its outer ends which fit up alongside of the drive belt and prevent the same from moving sidewise.

Extending rearwardly from the arms D' of the frame D are arms K on which is mounted a pivoted lever L carrying a frictional wheel M adapted to engage the drive pulley B and a sprocket chain N over which travels a sprocket chain O mounted on a sprocket wheel P carried by the reel E and it will be seen that when the frictional wheel M is thrown into engagement with the drive pulley B the reel will be operated so as to throw the winding arms into engagement with the drive belt, it of course being understood that the belt has been detached from the traction engine. The lever is locked in its adjusted position by a rack Q and when the frictional wheel is thrown out of engagement with the drive pulley B and the winding arms of the reel are thrown into a horizontal position, the drive belt passes freely over the same between the guide rollers F and J and over the guide roller H and when it is desired to wind the belt on the reel after the threshing has been completed, the belt is slipped off of the drive pulley of the traction engine and the momentum of the drive pulley B causes the wheel M when thrown into engagement with the same by the lever to rotate which in turn will operate the reel so as to wind the belt upon the same.

From the foregoing description, it will be seen that I have provided a device by means of which the belt used for driving the threshing machine can be easily and quicky wound upon a reel by simply operating a lever and at the same time it can be readily unwound and the belt used to drive the threshing machine without changing any of the parts.

Having thus fully described my invention, what I claim as new and desire to secure by Letters Patent, is:—

1. The combination with a threshing machine, of a reel carried by the machine, a drive belt, a drive pulley and means operated by the drive pulley of the machine for winding the drive belt upon the reel.

2. The combination with a threshing machine provided with the ordinary drive pulley, of a frame carried by the machine, a reel carried by the frame, guide rollers carried by the frame, a belt passing over said reel and drive pulley, and means operated by the drive pulley for operating said reel.

3. A device of the kind described, comprising a frame adapted to be secured to a threshing machine, a drive pulley carried by the machine, a reel carried by the frame, guide rollers carried by the frame, and means for operating said reel, said means being operated by the drive pulley of the threshing machine.

4. The combination with a drive shaft of a threshing machine, of a reel carried by the machine, a drive belt for operating said drive shaft and means for operating said reel by the momentum of the drive shaft of the machine so as to cause the belt to be wound thereon.

5. The combination with a threshing machine, of a reel carried by the machine, a drive pulley, a drive belt for operating the drive pulley of the machine passing over said reel and means operated by said drive pulley for operating said reel.

6. The combination with a threshing machine provided with a drive pulley, of a reel carried by the threshing machine, a frictional wheel engaging said drive pulley, a sprocket wheel carried by said wheel, a sprocket wheel carried by the reel, a chain passing over said sprockets, and means for throwing said reel into engagement with the drive pulley.

7. The combination with a threshing machine provided with a drive pulley, of a frame carried by the machine, a reel carried by the frame, a lever pivotally mounted on arms carried by the frame, a frictional wheel carried by said lever, sprocket chains carried by the wheel and reel, a chain passing over said sprockets, said frictional wheel being adapted to be thrown into engagement with the drive pulley of the threshing machine for operating said reel.

8. The combination with a threshing machine a drive pulley for operating said machine, a belt for operating said pulley, of a frame carried by the machine provided with guide rollers for guiding the belt for operating the machine, a reel carried by the frame, a frictional wheel adapted to engage said drive pulley and means connecting said frictional wheel to the reel for operating the same.

9. The combination with a threshing machine of a drive pulley for operating said drive pulley, a frame carried by the threshing machine provided with guide rollers for guiding the drive belt passing over the drive pulley, a reel carried by the frame provided with winding arms over which the drive belt passes, a lever carried by the frame, a frictional wheel carried by the lever engaging the drive pulley of the machine, sprocket chains carried by the frictional wheel and the reel, a sprocket chain passing over said sprockets and means for locking said lever in its adjusted position.

10. The combination with a threshing machine provided with a drive pulley having a drive belt passing over the same, of a frame carried by the machine provided with guide rollers, a reel carried by the frame, a sprocket carried by the reel, a lever pivotally mounted upon arms carried by the frame, a frictional wheel carried by the lever, a sprocket wheel carried by the frictional wheel, a chain passing over said sprocket wheel, said frictional wheel being adapted to be operated by the drive pulley of the threshing machine.

JULIUS BJORNLIE.

Witnesses:
 GEORGE F. KNAPPEN,
 HARRY A. WILLIAMS.